（12） United States Patent
Wang et al.

(10) Patent No.: US 12,404,939 B2
(45) Date of Patent: Sep. 2, 2025

(54) CONTROL VALVE AND THERMAL MANAGEMENT ASSEMBLY

(71) Applicant: ZHEJIANG SANHUA AUTOMOTIVE COMPONENTS CO., LTD., Zhejiang (CN)

(72) Inventors: Lixin Wang, Zhejiang (CN); Junqing Tu, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 186 days.

(21) Appl. No.: 18/038,020

(22) PCT Filed: Dec. 29, 2021

(86) PCT No.: PCT/CN2021/142260
§ 371 (c)(1),
(2) Date: May 21, 2023

(87) PCT Pub. No.: WO2022/143709
PCT Pub. Date: Jul. 7, 2022

(65) Prior Publication Data
US 2023/0407980 A1  Dec. 21, 2023

(30) Foreign Application Priority Data
Dec. 31, 2020  (CN) .......................... 202011623241.3

(51) Int. Cl.
F16K 11/085 (2006.01)
F16K 27/06 (2006.01)
F16K 31/04 (2006.01)

(52) U.S. Cl.
CPC ........ F16K 11/0853 (2013.01); F16K 27/065 (2013.01); F16K 31/043 (2013.01)

(58) Field of Classification Search
CPC .......................... F16K 11/0853; F16K 27/065
See application file for complete search history.

(56) References Cited

U.S. PATENT DOCUMENTS 4,800,924 A   1/1989   Johnson
4,883,226 A   11/1989  Tomita et al.
(Continued)

FOREIGN PATENT DOCUMENTS

CA   1302840 C   6/1992
CN   2423458 Y   3/2001
(Continued)

OTHER PUBLICATIONS

International Search Report for PCT/CN2021/142260 mailed Apr. 1, 2022, ISA/CN.
European search report issued on Aug. 26, 2024 for EP21914443.3.

*Primary Examiner* — Eric Keasel
(74) *Attorney, Agent, or Firm* — Yue (Robert) Xu; Apex Attorneys at Law, LLP

(57) ABSTRACT

A control valve and a thermal management assembly including the control valve are provided. The control valve includes a valve body component and a valve core; the valve body component is provided with interface channels, the valve core is provided with flow guiding channels, there are N flow guiding channels, and there are 2N interface channels, wherein N≥3 and N is an integer; by rotating the valve core, the 2N interface channels can implement communication between each two interface channels in different forms by the N flow guiding channels; in this way, when the control valve is applied to the thermal management assembly, the control valve can control multiple flow paths in the thermal management assembly by rotating the valve core.

18 Claims, 11 Drawing Sheets

(56) References Cited

U.S. PATENT DOCUMENTS

| | | | | |
|---|---|---|---|---|
| 5,529,758 | A | * | 6/1996 | Houston ............. F16K 11/0853 |
| | | | | 422/171 |
| 5,634,352 | A | * | 6/1997 | Nagai ..................... F25B 13/00 |
| | | | | 62/278 |
| 2006/0118066 | A1 | | 6/2006 | Martins |
| 2022/0136533 | A1 | | 5/2022 | Collins et al. |

FOREIGN PATENT DOCUMENTS

| | | |
|---|---|---|
| CN | 108119672 A | 6/2018 |
| CN | 109424765 A | 3/2019 |
| CN | 109424766 A | 3/2019 |
| CN | 210290845 U | 4/2020 |
| CN | 210461786 U | 5/2020 |
| CN | 111322432 A | 6/2020 |
| DE | 102018009680 A1 | 6/2020 |
| EP | 3029325 A1 | 6/2016 |
| JP | 2016109143 A | 6/2016 |
| WO | 2020161486 A1 | 8/2020 |

\* cited by examiner

CONTROL VALVE AND THERMAL MANAGEMENT ASSEMBLY

This application is the national phase of International Application No. PCT/CN2021/142260, titled "CONTROL VALVE AND THERMAL MANAGEMENT ASSEMBLY", filed on Dec. 29, 2021, which claims the benefit of the priority to Chinese Patent Application No. 202011623241.3, titled "CONTROL VALVE AND THERMAL MANAGEMENT ASSEMBLY", filed with the China National Intellectual Property Administration on Dec. 31, 2020, the entire disclosures thereof are incorporated herein by reference.

FIELD

The present application relates to a control valve and a thermal management assembly.

BACKGROUND

A control valve is generally used to control a flow path in a thermal management system, with the functions of the thermal management system becoming more and more complex, at present, the control of multiple flow paths of the system is generally carried out by multiple control valves, a technical problem to be addressed is to provide a control valve which can control the multiple flow paths of the system by only one control valve, to reduce the occupied space of the thermal management system.

SUMMARY

An object of the present application is to provide a control valve and a thermal management assembly, where the control valve can cope with the control of multiple flow paths in the thermal management assembly.

To achieve the above object, the following technical solutions are provided according to the present application.

A control valve includes a valve body component and a valve core, where the control valve has a valve body cavity, the valve core is at least partially located in the valve body cavity, the valve body component is provided with connecting port passages, the valve core is provided with guide passages, the valve core includes partition plates, a cavity of the valve core is divided into N guide passages by the partition plates, the number of the connecting port passages is defined as 2N, where N≥3 and N is a positive integer, and the valve core is configured to be rotated to realize different forms of pairwise communication among the 2N connecting port passages through the N guide passages.

A thermal management assembly includes a control valve and a fluid assembly, the control valve is the above control valve; the control valve and the fluid assembly can form at least one working fluid loop.

A control valve and a thermal management assembly are provided according to the present application, where the control valve includes a valve body component and a valve core, the valve body component has connecting port passages, the valve core has guide passages, the number of the guide passages is N, and the number of the connecting port passages is 2N, N≥3 and N is a positive integer; by rotating the valve core, the 2N connecting port passages can be in different forms of pairwise communication through the N guide passages. In this way, when the control valve is applied to the thermal management assembly, the control valve can control the multiple flow paths in the thermal management assembly by rotating the valve core, which makes the structure of the thermal management assembly more compact and reduces the occupied space of the thermal management assembly in the thermal management system, and thereby reducing the occupied space of the thermal management system.

DETAILED DESCRIPTION OF THE EMBODIMENTS

The present application will be further described as follows in conjunction with the drawings and specific embodiments.

Figure 1:
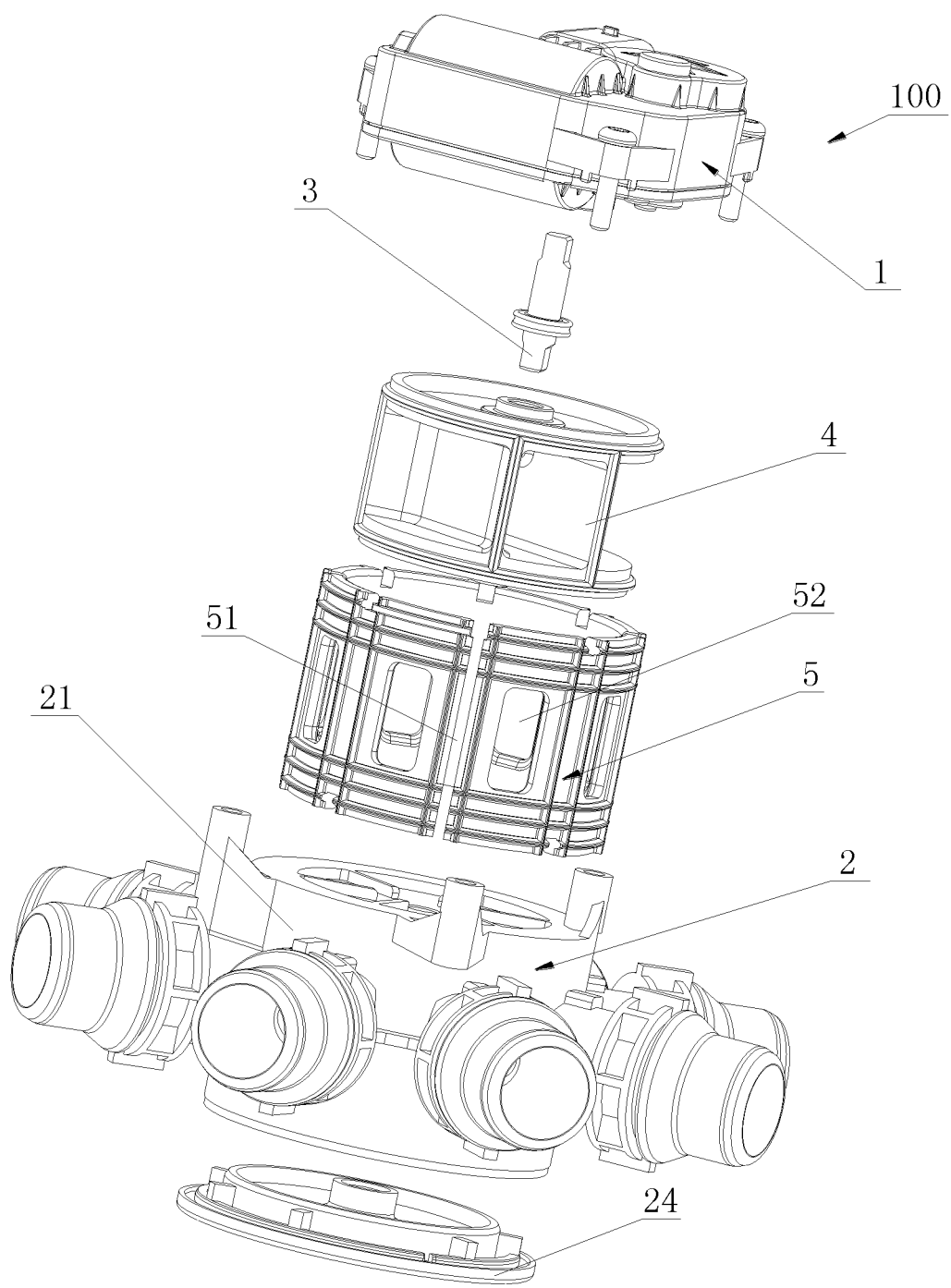
FIG. 1 is an exploded schematic view showing the structure of a control valve according to a solution of a first embodiment.
Figure 2:
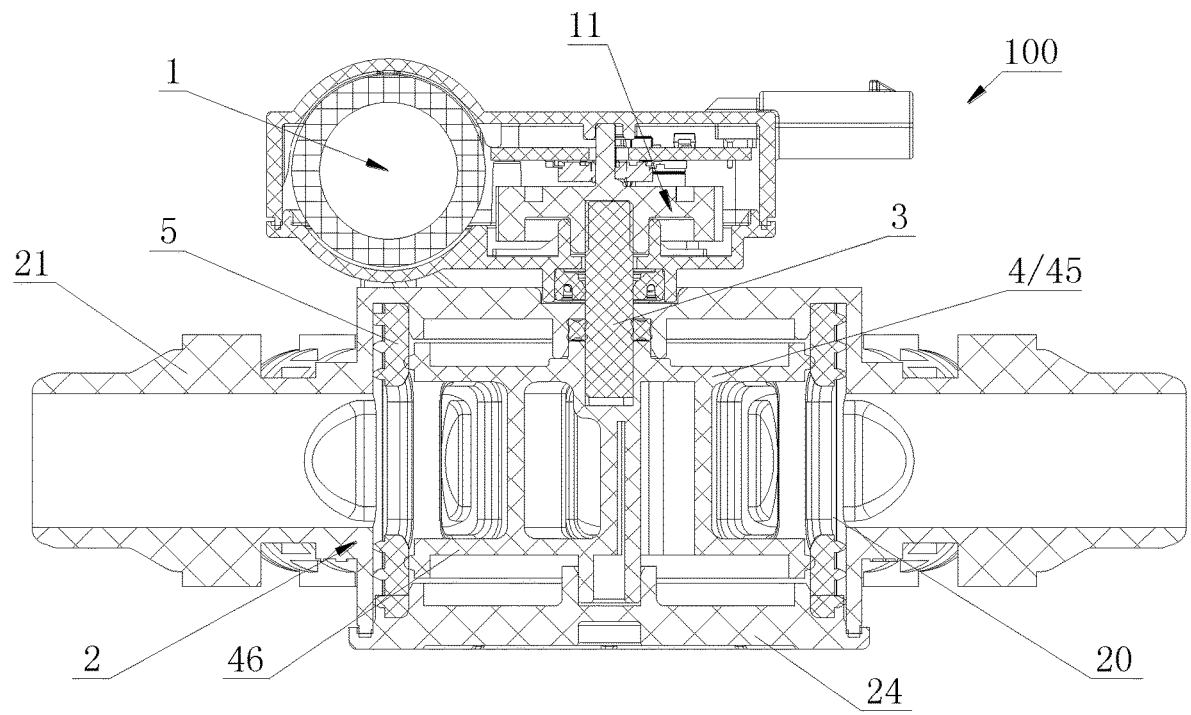
FIG. 2 is a schematic cross-sectional view showing the structure of the control valve according to the solution of the first embodiment.

Referring to FIG. 1 and FIG. 2, the control valve can be applied to a vehicle thermal management system, and the vehicle thermal management system includes a new energy vehicle thermal management system. The control valve 100 includes a drive component 1, a valve body component 2, a valve stem 3, a valve core 4 and a sealing assembly 5. The drive component 1 and the valve body component 2 may be fixedly connected by fasteners such as screws. The control valve 100 has a valve body cavity 20, the valve body component 2 forms at least part of a peripheral wall of the valve body cavity 20, at least part of the valve core 4 is located in the valve body cavity 20, one end of the valve stem 3 is in transmission connection with the drive component 1, and the other end of the valve stem 3 is in transmission connection with the valve core 4. In this application, the transmission connection between two components means that power can be transmitted between the two components; the two components may be in an interference fit with each other, or may be closely fitted to each other by fasteners; the two components may be directly connected or may be connected through power transmission structures such as gears for transmission connection. The drive component 1 outputs a rotating torque to the valve stem 3, the valve stem 3 drives the valve core 4 to rotate. Of course, in other embodiments, the valve stem 3 and valve core 4 may also be provided as an integral structure. The sealing assembly 5 is located in the valve body cavity 20, and is located on a periphery of the valve core 4; the sealing assembly 5 is pressed between the valve core 4 and the valve body component 2, and is pressed in a sealing state. In this embodiment, the drive component 1 includes a transmission mechanism 11, the transmission mechanism 11 may be a reduction gearing, at least part of the transmission mechanism 11 is located in the drive component 1, and the drive component 1 is in transmission connection with the valve stem 3 through the transmission mechanism 11. By providing the transmission mechanism 11, in case that the rotating torque outputted by the motor of the drive component 1 cannot directly drive the valve core 4 to rotate or the rotating torque is insufficient, the rotating torque outputted by the motor can be increased by the transmission mechanism 11, and the increased rotating torque is transmitted to the valve core 4 through the valve stem 3, thereby driving the valve core 4 to rotate. Of course, in other embodiments, when the rotating torque outputted by the motor is enough to drive the valve core 4, the drive component 1 may not include the transmission mechanism 11.

Figure 3:
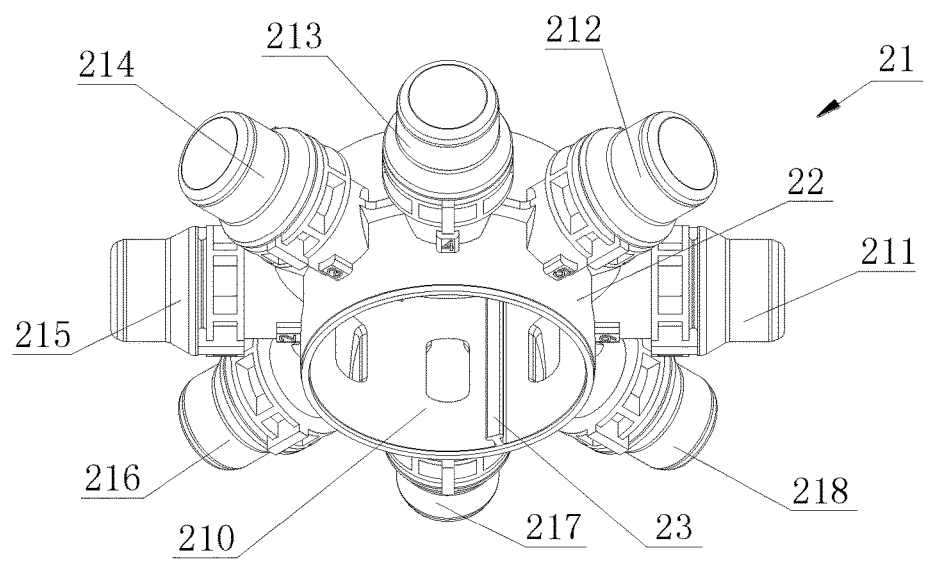
FIG. 3 is a three-dimensional schematic view showing the structure of a main valve body in FIG. 1.
Figure 4:
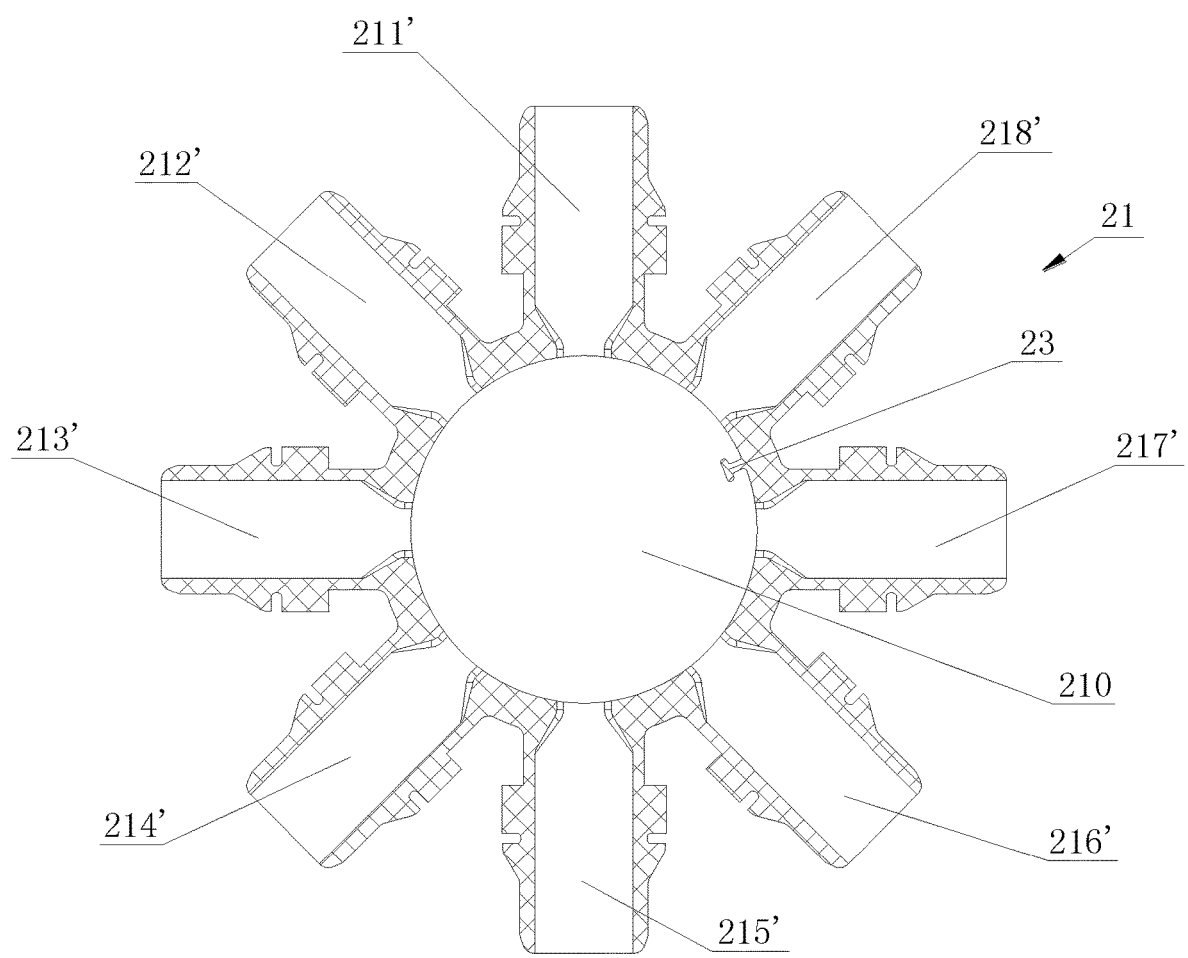
FIG. 4 is a schematic cross-sectional view showing the structure of the main valve body in FIG. 1.

Referring to FIG. 3 and FIG. 4, the valve body component 2 includes a main valve body 21, the main valve body 21 includes a side wall 22 and multiple connecting port portions in communication with an outside, and the side wall 22 is connected with the connecting port portions. Specifically, in this embodiment, the main valve body 21 includes eight connecting port portions, namely a first connecting port portion 211, a second connecting port portion 212, a third connecting port portion 213, a fourth connecting port portion 214, a fifth connecting port portion 215, a sixth connecting port portion 216, a seventh connecting port portion 217, and an eighth connecting port portion 218, and the eight connecting port portions are arranged along a periphery of the side wall 22 in the listed sequence. In this embodiment, the connecting port portions are circumferentially distributed along the periphery of the side wall 22. For example, the connecting port portions are equidistantly distributed along the outer circumference of the side wall 22 and each extends away from the valve body cavity 20 along a radial direction of the side wall 22, and the connecting port portions are located at a same height position or substantially located at a of the main valve body 21. The main valve body 21 has a first cavity 210, and there're eight connecting port passages corresponding to the eight connecting port portions respectively, at least part of each of the connecting port passages is located at the corresponding connecting port portion; the eight connecting port passages includes a first connecting port passage 211', a second connecting port passage 212', a third connecting port passage 213', a fourth connecting port passage 214', a fifth connecting port passage 215', a sixth connecting port passage 216', a seventh connecting port passage 217', an eighth connecting port passage 218'. For example, the first connecting port portion 211 corresponds to the first connecting port passage 211', and the second connecting port portion 212 corresponds to the second connecting port passage 212', as far as the main valve body 21 is concerned, the eight connecting port passages are respectively in communication with the first cavity 210.

Referring to FIG. 1 to FIG. 4, the valve body component 2 further includes a cover 24, the cover 24 is fixedly connected with the main valve body 21, specifically, the fixed connection between the cover and the main valve body may be realized by welding, or gluing, or snap-in connection, or interference fit. Further, in order to prevent the leakage of working fluid, it is necessary to seal the cover 24 and the main valve body 21. The cover 24 is assembled with the main valve body 21 to form the valve body cavity 20, and the valve body cavity 20 at least partially coincides with the first cavity 210. The main valve body 21 further includes a protrusion 23, and the protrusion 23 is located between two adjacent connecting port passages along a circumferential direction of the side wall 22. The number of the protrusion 23 may be one or more, and the protrusion 23 may extend inward to the valve body cavity 20 along the radial direction of the side wall 22, or the protrusion 23 may extend inward to the valve body cavity 20 in a direction intersecting with the radial direction, or the protrusion 23 extends in the radial direction, opposite to the connecting port portion, of the side wall 22. A protruding height of the protrusion 23 to the valve body cavity 20 does not exceed a thickness of the sealing assembly 5, and the protrusion 23 is provided for limiting or fixing the sealing assembly 5. Specifically, the sealing assembly 5 is provided with a notch 51 (referring to FIG. 1), the sealing assembly 5 is located in the valve body cavity 20, the notch 51 and the protrusion 23 are fitted with each other in the form of a interference fit or a limiting fit, so that the sealing assembly 5 and the main valve body 21 can be better limited or fixed. The sealing assembly 5 is further provided with a through hole 52 in communication with the connecting port passage. In this embodiment, the sealing assembly 5 has eight through holes 52 corresponding to the eight connecting port passages respectively, and the eight connecting port passages are in communication with the eight through holes respectively. The valve body component 2 may be made of a plastic material through injection molding, for example, the plastic material may be polyamide (PA) material, or polyphthalamide (PPA) material, or nylon material, etc. The main body material of the sealing assembly 5 may be made of a plastic material through injection molding, for example, fluorine-containing polymers such as polyvinylidene fluoride and polyvinylidene difluoride (PVDF) or other high molecular polymers may be used; or the sealing assembly 5 may be an integral structure formed by an elastic piece and a sealing piece, the elastic piece may be made of materials including rubber, the sealing piece may be made of materials including Teflon. The elastic piece is located between the sealing piece and the side wall 22, and the sealing piece is in contact with the valve core 4. In addition, with cooperation between the notch 51 with the protrusion 23, alignment of the sealing assembly 5 may be performed, so that the eight through holes of the sealing assembly 5 are in one-to-one correspondence with the eight connecting port passages respectively.

Figure 5:
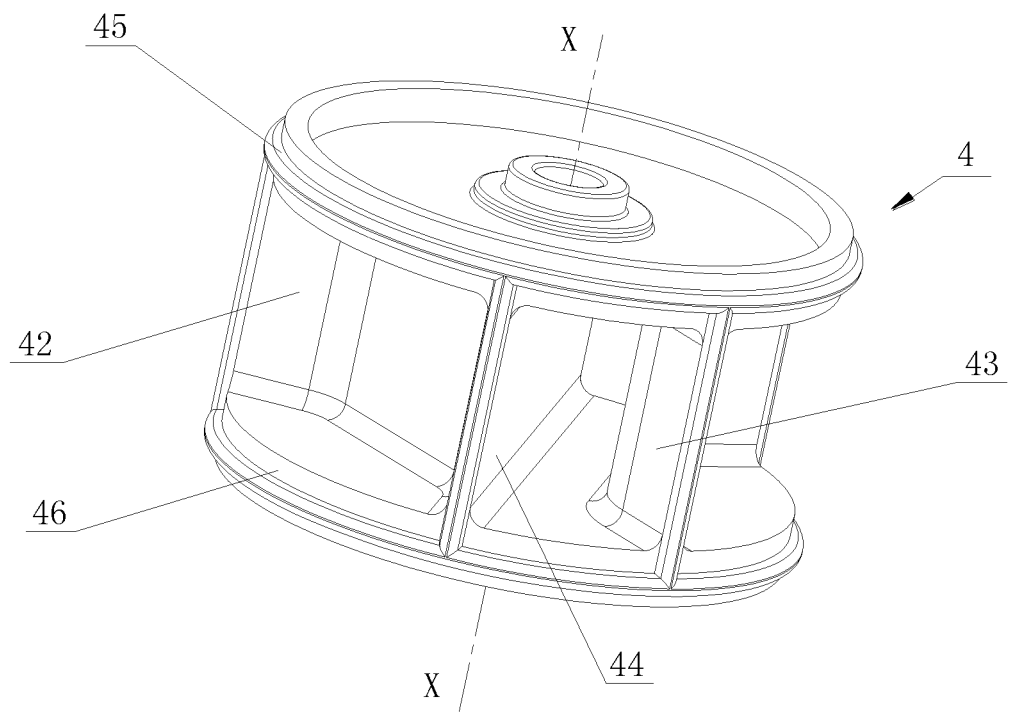
FIG. 5 is a three-dimensional schematic view showing the structure of a valve core in FIG. 1.
Figure 6:
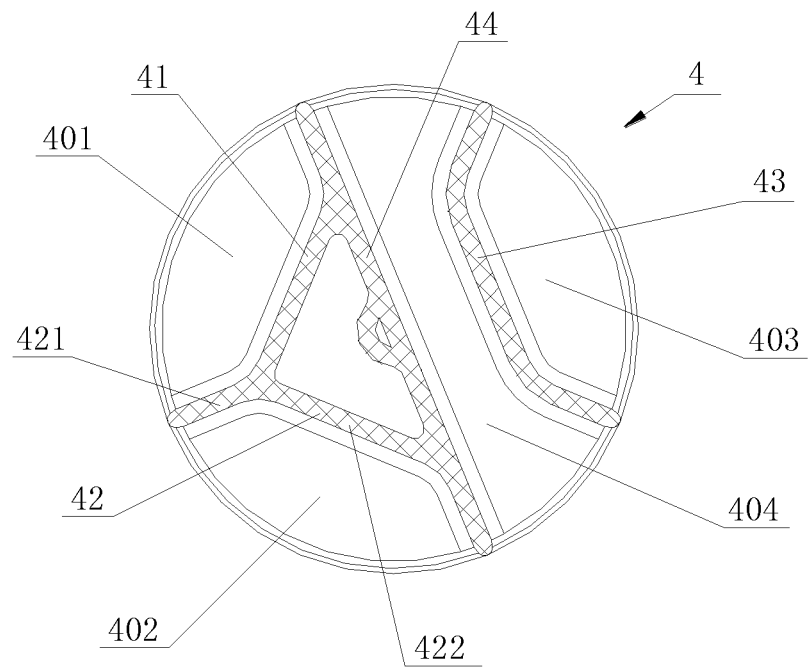
FIG. 6 is a schematic cross-sectional view showing the structure of the valve core in FIG. 1.

Referring to FIG. 5 and FIG. 6, the valve core 4 may be made of a plastic material through one-piece injection molding, for example, the valve core may be made of nylon material or polyphenylene sulfide (PPS) material through injection molding. The valve core 4 has multiple guide passages, in this embodiment, the valve core 4 has four guide passages, namely a first guide passage 401, a second guide passage 402, a third guide passage 403 and a fourth guide passage 404. The guide passages are separated by partition plates, specifically, the valve core 4 includes a first partition plate 41, a second partition plate 42, a third partition plate 43, and a fourth partition plate 44; the first partition plate 41, the second partition plate 42 and the fourth partition plate 44 have extending directions intersect in pairs, and the three partition plates are connected in pairs; the third partition plate 43 and the fourth partition plate 44 are spaced apart; in the radial direction of the valve core 4, by taking the fourth partition plate 44 as a benchmark, both the first partition plate 41 and the second partition plate 42 are located at one side of the fourth partition plate 44, and the third partition plate 43 is located at the other side of the fourth partition plate 44.

The valve core 4 further includes a first end wall 45 and a second end wall 46, along the axial direction of the valve core 4, at least part of the partition plate is located between the first end wall 45 and the second end wall 46. Two edges of each of the partition plates in the axial direction of the valve core 4 are defined as two ends, and two edges of each of the partition plates in a direction perpendicular to the axial direction of the valve core 4 are defined as two sides, one end of each of the partition plates in the axial direction of the valve core 4 is connected with the first end wall 45, the other end of each of the partition plates in the axial direction of the valve core 4 is connected with the second end wall 46, one side of the first partition plate 41 is connected with the second partition plate 42, the other side of the first partition plate 41 is connected with the fourth partition plate 44. Specifically, the second partition plate 42 includes a first section 421 and a second section 422, the first section 421 and the second section 422 intersect in their respective extension directions, one side of the first partition plate 41 is connected with a junction of the first section 421 and the second section 422, one side of the second partition plate 42 is flush with an outer edge of the first end wall 45 and/or an outer edge of the second end wall 46. In this embodiment, when the main body of the valve core 4 is a columnar structure, the other side of the first partition plate 41 is flush with the outer edge of the first end wall 45 and the outer edge of the second end wall 46. In an embodiment, when the main body of the valve core 4 is a conical structure or other structure, the end of the other side of the first partition plate 41 is flush with the outer edge of the corresponding first end wall 45 or the outer edge of the corresponding second end wall 46, the positional relationship between other partition plates and the end walls is similar to the positional relationship between the first partition plate and the end walls. The other side of the second partition plate 42 is connected with the fourth partition plate 44, one side of the fourth partition plate 44 is flush with the outer edge of the first end wall 45 and/or the outer edge of the second end wall 46, the other side of the fourth partition plate 44 is flush with the outer edge of the first end wall 45 and/or the outer edge of the second end wall 46. The third partition plate 43 and the fourth partition plate 44 are spaced apart, the third partition plate 43 is not directly connected with the fourth partition plate 44, both sides of the third partition plate 43 are flush with the outer edge of the first end wall 45, and/or both sides of the third partition plate 43 are flush with the outer edge of the second end wall 46. A first guide passage 401 and a second guide passage 402 are formed among the first partition plate 41, the second partition plate 42, the fourth partition plate 44, the first end wall 45 and the second end wall 46; in the direction perpendicular to the axial direction of valve core 4, both the first guide passage 401 and the second guide passage 402 are located at one side of the fourth partition plate 44, and the first guide passage 401 and the second guide passage 402 may be symmetrically distributed; a third guide passage 403 is formed among the third partition plate 43, the first end wall 45 and the second end wall 46; a fourth guide passage 404 is formed among the fourth partition plate 44, the third partition plate 43, the first end wall 45 and the second end wall 46. In the direction perpendicular to the axial direction of valve core 4, both the third guide passage 403 and the fourth guide passage 404 are located at the other side of the fourth partition plate 44, the fourth guide passage 404 is located closer to the fourth partition plate 44 than the third guide passage 403. In this embodiment, the shape and size of the first end wall 45 may be the same as those of the second end wall 46, a plane is defined to be perpendicular to a central axis X-X of the valve core 4, a projection of the first end wall 45 and a projection of the second end wall 46 on this plane are circular and coincide with each other, a projection of the first end wall 45 and/or a projection of the second end wall 46 on this plane is divided into two parts with equal or substantially equal areas by a projection of the fourth partition plate 44 on this plane. Since the first partition plate 41, the second partition plate 42 and the fourth partition plate 44 are connected with one another, the projections of the first partition plate 41, the second partition plate 42 and the fourth partition plate 44 on this plane are combined to form a substantially triangular structure.

Referring to FIG. 2, the valve core 4 is located in the valve body cavity 20, the sealing assembly 5 is located on the periphery of the valve core 4; the outer edge of the first end wall 45, the outer edge of the second end wall 46, and the sides, which are flush with the outer edge of the first end wall 45 and the outer edge of the second end wall 46, of the partition plates are sealingly abutted against an inner side face of the sealing assembly 5 respectively. In this way, the guide passages can be sealed off by the sealing assembly 5, so that the guide passages are not directly communicated.

When the control valve 100 is applied in the thermal management system, one or more working modes of the control valve may be selected by the system; specifically, different working modes can be selected and controlled by rotating the valve core according to different needs of the system. For example, in this embodiment, the control valve 100 has eight connecting port passages, the valve core 4 has four guide passages, every time the valve core 4 rotates by 45 degrees, the control valve switches the working mode once; as the valve core 4 rotates by 360 degrees, the control valve can realize eight working modes. Referring to FIG. 7 to FIG. 11, a thermal management assembly is provided according to this embodiment, the thermal management system includes a thermal management assembly, and the thermal management assembly 200 has at least one working fluid loop. In this embodiment, the thermal management assembly 200 includes a control valve 100 and a fluid assembly, the control valve 100 and the fluid assembly can form at least one working fluid loop; in some embodiments, the fluid assembly includes a first pump 201, a second pump 202, a battery heat exchange component 203, a first heat exchanger 204, an electronic device cooling component 205, a radiator 206, a second heat exchanger 207, and pipeline for communicating the components, where the working fluid may be a cooling liquid and the radiator may be an air-cooled radiator.

In the thermal management assembly 200, the control valve 100 includes at least one of the following five working modes, which are specifically as follows.

Figure 7:
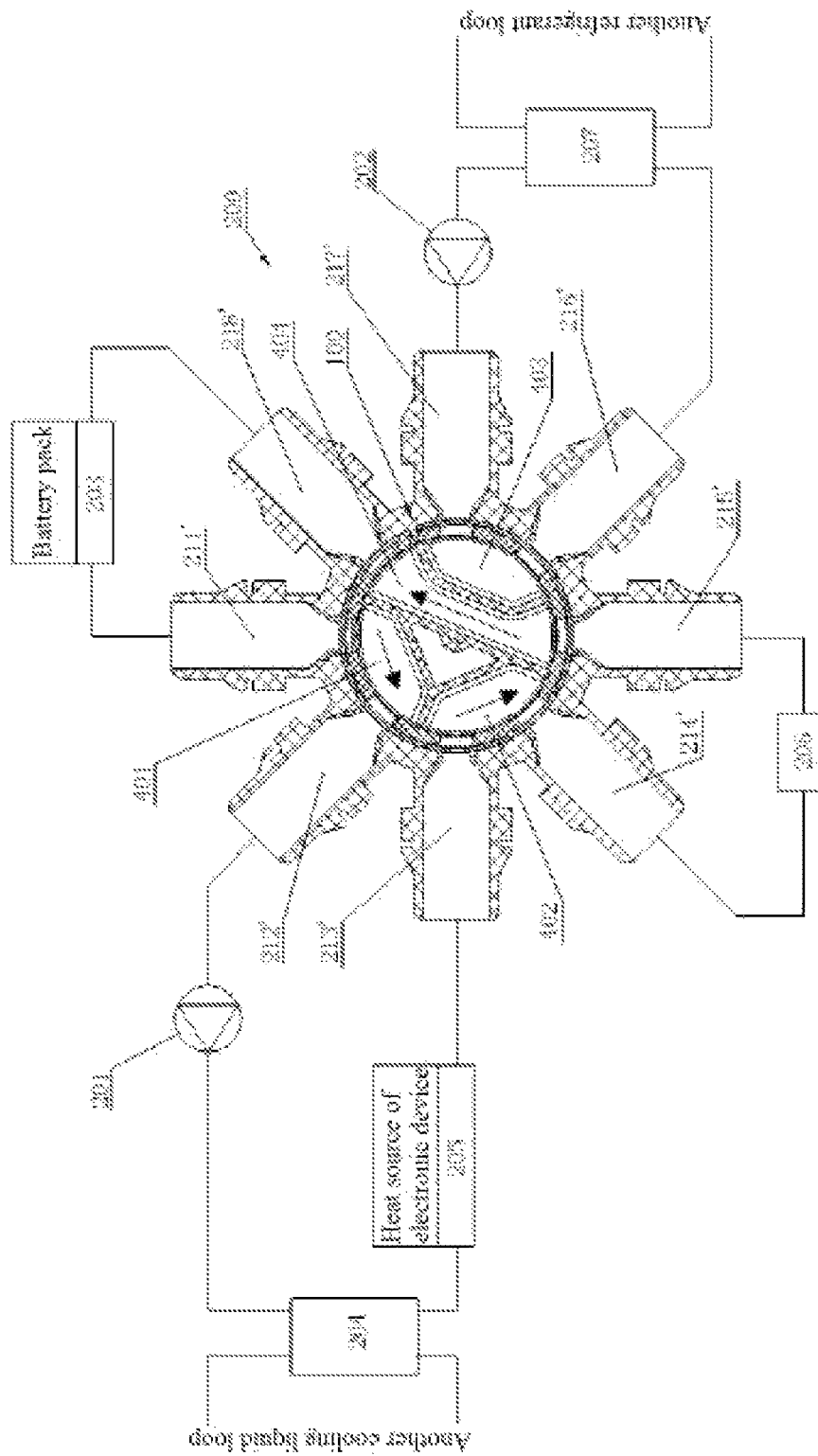
FIG. 7 is a schematic diagram of multi-flow control of a thermal management assembly when the valve core of the control valve is at a 0 degree position.

Referring to FIG. 7, a first working mode is shown, a position of the valve core 4 in this case is defined as an initial position, that is, a rotated angle of the valve core 4 is defined as 0 degrees; in this case, the first connecting port passage 211' is in communication with the second connecting port passage 212' through the first guide passage 401, the third connecting port passage 213' is in communication with the fourth connecting port passage 214' through the second guide passage 402, the fifth connecting port passage 215' is in communication with the eighth connecting port passage 218' through the fourth guide passage 404. In the first working mode, the sixth connecting port passage 216' is in communication with the seventh connecting port passage 217' through the third guide passage 403, but the above two connecting port passages have no using function in this case; specifically, in the first working mode, the second pump 202 does not start, the sixth connecting port passage 216' and the seventh connecting port passage 217' do not participate in the circulation of the cooling liquid.

In the first working mode, the first pump 201 starts, the cooling liquid (which may be water or other cooling liquids) in the pipeline flows to the first heat exchanger 204 under the action of the first pump 201, the cooling liquid in the first heat exchanger 204 exchanges heat with the working fluid of another fluid loop in the heat management system (such as a refrigerant in a refrigerant loop or a cooling liquid in another cooling liquid loop). In this embodiment, specifically, the cooling liquid in the first heat exchanger exchanges heat with the cooling liquid in the another cooling liquid loop, the cooling liquid, after being cooled by the first heat exchanger 204, flows to an electronic device cooling component 205; the cooling liquid in the electronic device cooling component 205 exchanges heat with a heat source of the electronic device in the vehicle, to absorb the heat of the heat source of the electronic device and then flows to the third connecting port passage 213', and after flowing through the second guide passage 402, the cooling liquid flows out of the fourth connecting port passage 214' and flows to the air-cooled radiator 206; the cooling liquid in the air-cooled radiator 206 exchanges heat with air, after being cooled by the air-cooled radiator 206, the cooling liquid flows to the fifth connecting port passage 215', then flows through the fourth guide passage 404 and flows out of the eighth connecting port passage 218', and finally flows to the battery heat exchange component 203; the cooling liquid in the battery heat exchange component 203 exchanges heat with the battery pack of the vehicle, to heat the battery pack with the residual heat after heat dissipation by the air-cooled radiator 206, then flows to the first connecting port passage 211; and finally, the cooling liquid flows through the first guide passage 401 and then flows out of the second connecting port passage 212' to flow to the first pump 201 for the next working cycle. It should be noted that, the main reason for heating the battery pack is that, in winter or in a low-temperature environment, the temperature of the battery pack is low when the vehicle starts, so heating the battery pack is helpful for the temperature of the battery to quickly enter the working range, to make the battery pack work normally.

Figure 8:
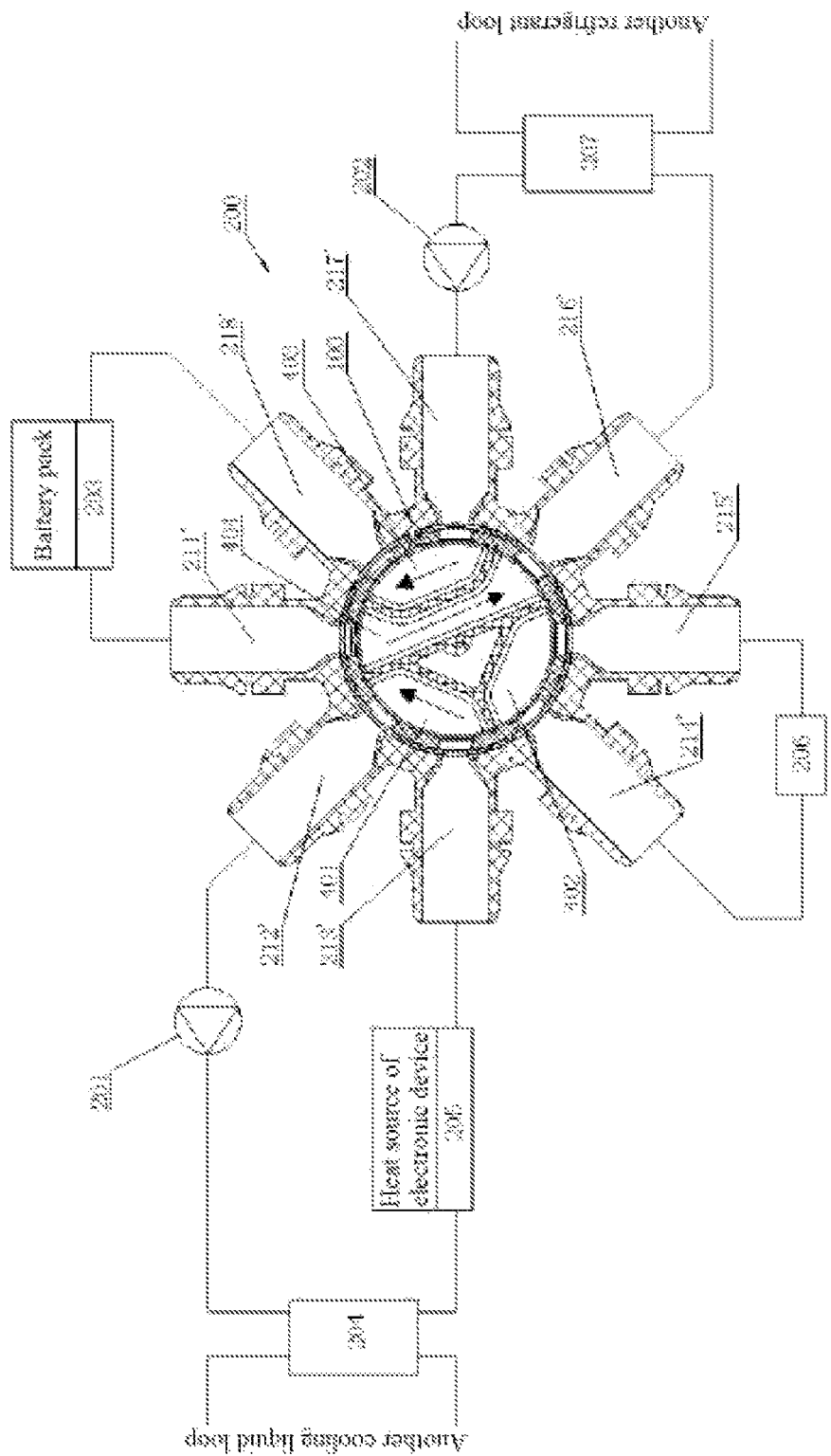
FIG. 8 is a schematic diagram of multi-flow control of the thermal management assembly when the valve core of the control valve is at a 45 degree position.

Referring to FIG. 8, a second working mode is shown, on the basis of the first working mode, the valve core 4 rotates by 45 degrees counterclockwise to reach the position shown in FIG. 8, in this case, the first connecting port passage 211' is in communication with the sixth connecting port passage 216' through the fourth guide passage 404, and the second connecting port passage 212' is in communication with the third connecting port passage 213' through the first guide passage 401, the seventh connecting port passage 217' is in communication with the eighth connecting port passage 218' through the third guide passage 403. In the second working mode, the fourth connecting port passage 214' is in communication with the fifth connecting port passage 215' through the second guide passage 402, but the above two connecting port passages have no using function in this case, that is, in the second working mode, the fourth connecting port passage 214' and the fifth connecting port passage 215' do not participate in the circulation of the cooling liquid.

In the second working mode, the second pump 202 starts, the cooling liquid cooled by the second heat exchanger 207 flows to the seventh connecting port passage 217' under the action of the second pump 202; after flowing through the third guide passage 403, the cooling liquid flows out of the eighth connecting port passage 218' and flows to the battery heat exchange component 203; the cooling liquid in the battery heat exchange component 203 exchanges heat with the battery pack, absorbs the heat of the battery pack and then flows to the first connecting port passage 211; and after flowing through the fourth guide passage 404, the cooling liquid flows out of the sixth connecting port passage 216' and flows to the second heat exchanger 207; the cooling liquid in the second heat exchanger 207 exchanges heat with the working fluid in another loop of the thermal management system. In this embodiment, specifically, the cooling liquid in the second heat exchanger exchanges heat with the refrigerant in the refrigerant loop, and the cooling liquid, after being cooled by the second heat exchanger 207, flows to the second pump 202 for the next working cycle. The first pump 201 starts, the cooling liquid flows to the first heat exchanger 204 under the action of the first pump 201, and then flows to the electronic device cooling component 205 after being cooled by the first heat exchanger 204, the cooling liquid in the electronic device cooling component 205 exchanges heat with the heat source of the electronic device, absorbs the heat of the heat source of the electronic device and flows to the third connecting port passage 213', then the cooling liquid flows through the first guide passage 401 and flows out of the second connecting port passage 212', and then flows to the first pump 201 for the next working cycle. In the second working mode, the cooling liquid performs heat exchange to the battery pack and the heat source of the electronic device respectively, so as to cool the battery pack and the heat source of the electronic device.

Figure 9:
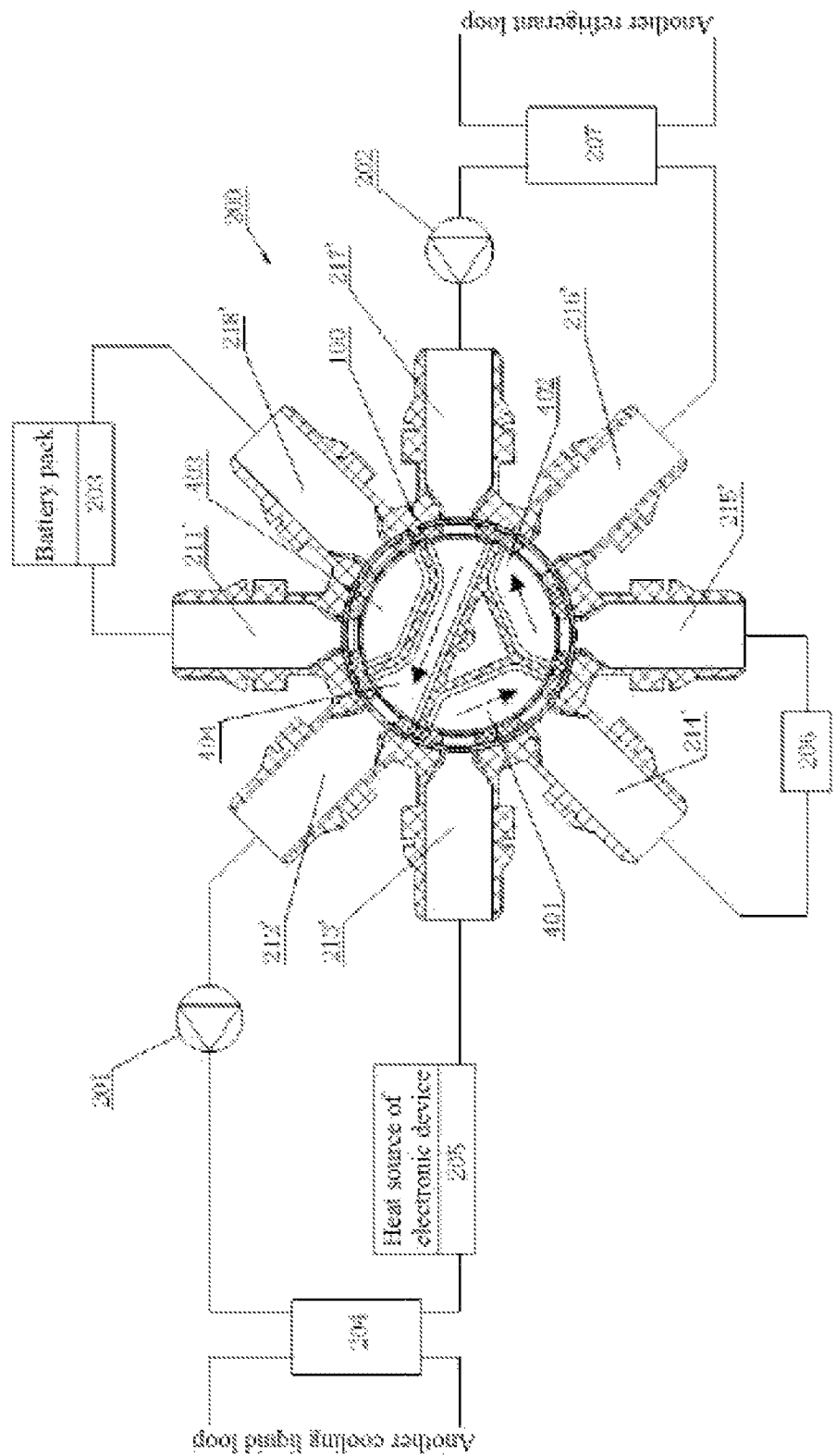
FIG. 9 is a schematic diagram of multi-flow control of the thermal management assembly when the valve core of the control valve is at a 90 degree position.

Referring to FIG. 9, a third working mode is shown, on the basis of the first working mode, the valve core 4 rotates by 90 degrees counterclockwise to the position shown in FIG. 9, the second connecting port passage 212' is in communication with the seventh connecting port passage 217' through the fourth guide passage 404, the third connecting port passage 213' is in communication with the fourth connecting port passage 214' through the first guide passage 401, and the fifth connecting port passage 215' is in communication with the sixth connecting port passage 216' through the second guide passage 402. In the third working mode, the first connecting port passage 211' is in communication with the eighth connecting port passage 218' through the third guide passage 403, but the above two connecting port passages have no using function in this case, that is, in the third working mode, the first connecting port passage 211' and the eighth connecting port passage 218' do not participate in the circulation of the cooling liquid.

In the third working mode, the first pump 201 and the second pump 202 start, and the cooling liquid, after being cooled by the second heat exchanger 207, flows to the seventh connecting port passage 217; after flowing through the fourth guide passage 404, the cooling liquid flows out of the second connecting port passage 212' and flows to the first heat exchanger 204 through the first pump 201; the cooling liquid can be cooled by the first heat exchanger 204 again and then flows to the electronic device cooling component 205, to exchange heat with the heat source of the electronic device; after absorbing the heat from the heat source of the electronic device, the cooling liquid flows to the third connecting port passage 213', passes through the first guide passage 401, then flows out of the fourth connecting port passage 214', and then flows to the air-cooled radiator 206; after being cooled by the air-cooled radiator 206, the cooling liquid flows to the fifth connecting port passage 215', passes through the second guide passage 402 and flows out of the sixth connecting port passage 216', to flow to the second heat exchanger 207; after being cooled by the second heat exchanger 207; the cooling liquid flows to the second pump 202 for the next working cycle. In the third working mode, after being cooled by the first heat exchanger 204, the second heat exchanger 207 and the air-cooled radiator 206, the cooling liquid has a relative low temperature to perform heat exchange with the heat source of electronic device, so that the heat source of electronic device can be cooled quickly.

Figure 10:
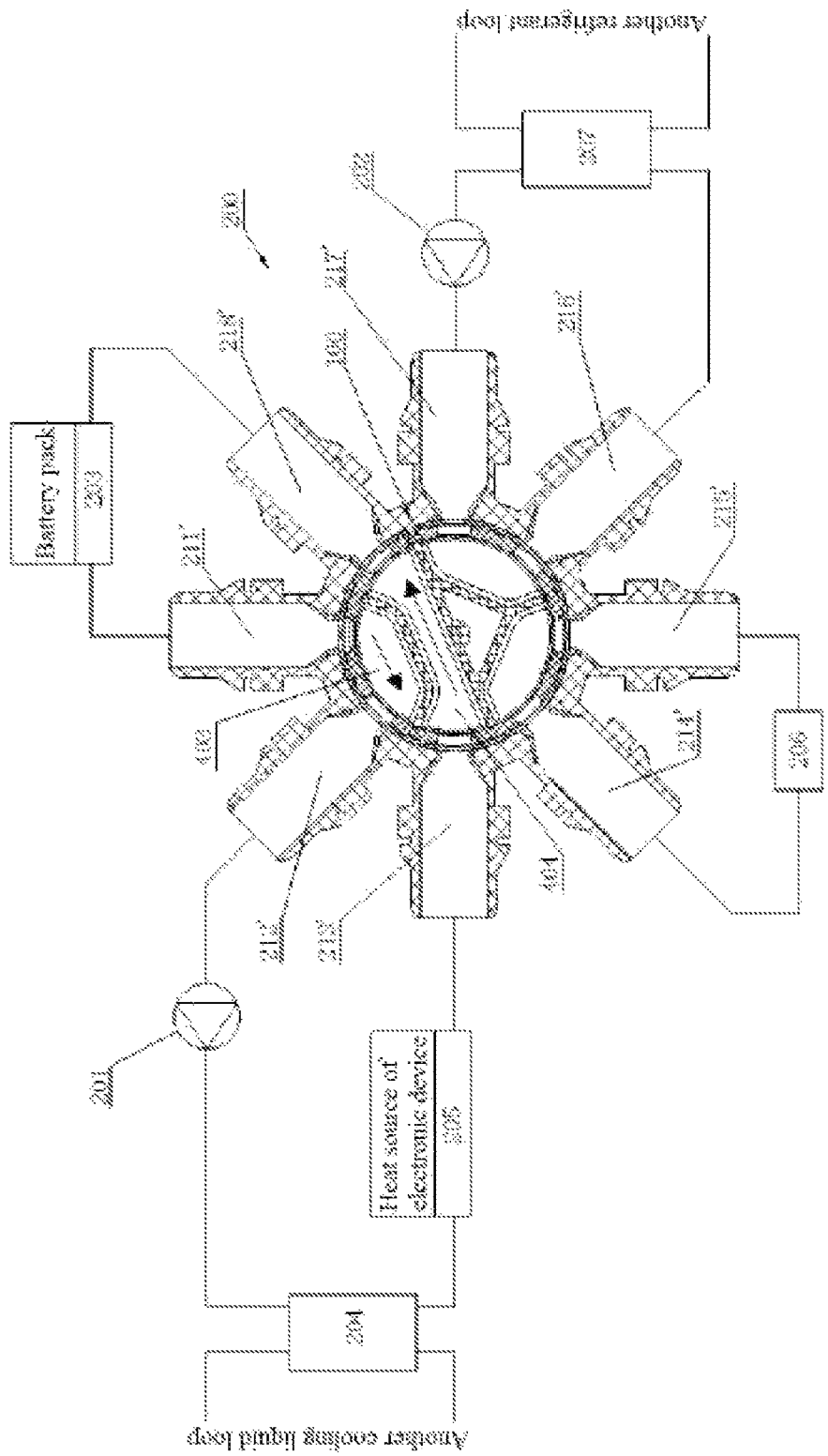
FIG. 10 is a schematic diagram of multi-flow control of the thermal management assembly when the valve core of the control valve is at a 135 degree position.

Referring to FIG. 10, a fourth working mode is shown, on the basis of the first working mode, the valve core 4 rotates by 135 degrees counterclockwise to the position shown in FIG. 10, in this case, the first connecting port passage 211' is in communication with the second connecting port passage 212' through the third guide passage 403, the third connecting port passage 213' is in communication with the eighth connecting port passage 218' through the fourth guide passage 404. In the fourth working mode, the fourth connecting port passage 214' is in communication with the fifth connecting port passage 215' through the first guide passage 401, the sixth connecting port passage 216' is in communication with the seventh connecting port passage 217' through the second guide passage 402; however, the fourth connecting port passage 214', the fifth connecting port passage 215', the sixth connecting port passage 216' and the seventh connecting port passage 217' have no using function in this case. Specifically, the second pump 202 does not start, the sixth connecting port passage 216' and the seventh connecting port passage 217' do not participate in the circulation of the cooling liquid; in addition, in the fourth working mode, the fourth connecting port passage 214' and the fifth connecting port passage 215' also do not participate in the circulation of the cooling liquid.

In the fourth working mode, the first pump 201 starts, the cooling liquid, after being cooled by the first heat exchanger 204, flows to the electronic device cooling component 205; the cooling liquid in the electronic device cooling component 205 exchanges heat with the heat source of the electronic device, absorbs the heat of the heat source of the electronic device and flows to the third connecting port passage 213', then passes through the fourth guide passage 404, and then flows out of the eighth connecting port passage 218', to flow to the battery heat exchange component 203; the cooling liquid in the battery heat exchange component 203 exchanges heat with the battery pack, to heat the battery pack with the heat absorbed from the heat source of the electronic device, then the cooling liquid flows to the first connecting port passage 211', passes through the third guide passage 403 and flows out of the second connecting port passage 212', to flow to the first pump 201 for the next working cycle. Compared with the first working mode, in the fourth working mode, the heat absorbed from the heat source of the electronic device by the cooling liquid directly heats the battery pack without passing through the air-cooled radiator 206, which is beneficial to improving the heating speed of the battery pack, to improve the utilization efficiency.

Figure 11:
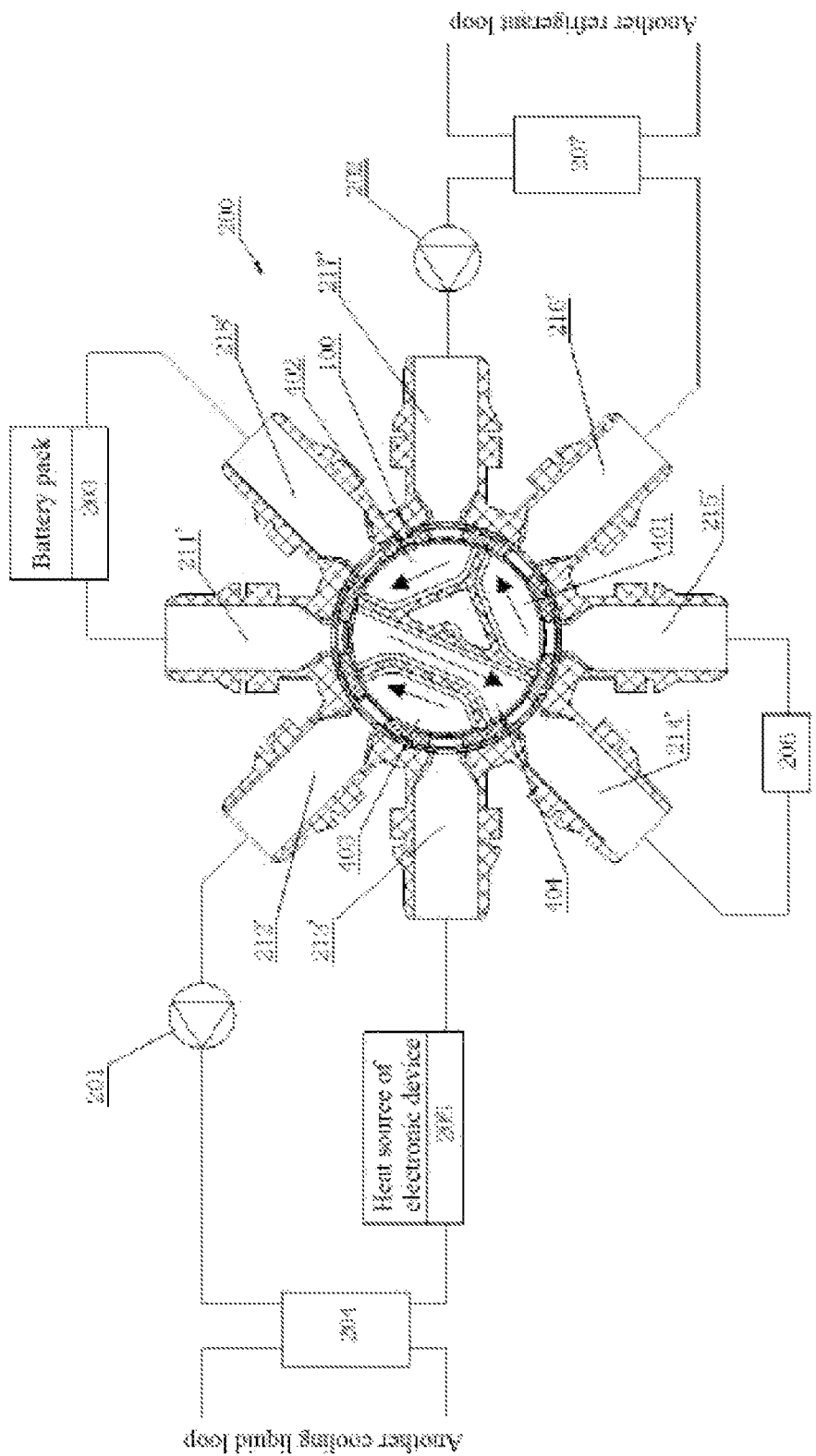
FIG. 11 is a schematic diagram of multi-flow control of the thermal management assembly when the valve core of the control valve is at a 180 degree position.

Referring to FIG. 11, a fifth working mode is shown, on the basis of the first working mode, the valve core 4 rotates by 180 degrees counterclockwise to the position shown in FIG. 11, in this case, the first connecting port passage 211' is in communication with the fourth connecting port passage 214' through the fourth guide passage 404, the second connecting port passage 212' is in communication with the third connecting port passage 213' through the third guide passage 403, the fifth connecting port passage 215' is in communication with the sixth connecting port passage 216' through the first guide passage 401, and the seventh connecting port passage 217' is in communication with the eighth connecting port passage 218' through the second guide passage 402.

In the fifth working mode, the first pump 201 starts, the cooling liquid flows to the first heat exchanger 204 under the action of the first pump 201, after being cooled by the first heat exchanger 204, the cooling liquid flows to the electronic device cooling component 205; the cooling liquid in the electronic device cooling component 20 exchanges heat with the heat source of the electronic device, after absorbing the heat from the heat source of the electronic device, the cooling liquid flows to the third connecting port passage 213', passes through the third guide passage 403 and then flows out of the second connecting port passage 212', to flow to the first pump 201 for the next working cycle. The second pump 202 starts, the cooling liquid cooled by the second heat exchanger 207 flows to the seventh connecting port passage 217' under the action of the second pump 202, passes the second guide passage 402 and flows out of the eighth connecting port passage 218', to flow to the battery heat exchange component 203; the cooling liquid in the battery heat exchange component 203 exchanges heat with the battery pack, absorbs the heat of the battery pack and flows to the first connecting port passage 211', then passes through the fourth guide passage 404 and flows out of the fourth connecting port passage 214', to flow to the air-cooled radiator 206; after being cooled by the air-cooled radiator 206, the cooling liquid flows to the fifth connecting port passage 215', passes through the first guide passage 401 and flows out of the sixth connecting port passage 216', to flow to the second heat exchanger 207; after being cooled again by the second heat exchanger 207, the cooling liquid flows to the second pump 202 for the next working cycle. Compared with the second working mode, in the fifth working mode, after being cooled by both the air-cooled radiator 206 and the second heat exchanger 207, the cooling liquid has a relative low temperature to perform heat exchange with the battery pack, so that the battery pack can be cooled quickly.

Other working modes of the control valve 100 in the thermal management module 200 are not listed one by one. In addition, the counterclockwise direction herein is merely defined by taking the embodiments shown in the figures as examples, which does not limit the counterclockwise direction. It should be noted that, for different thermal management systems, the control valve may have different working modes by rotating the valve core.

In different thermal management systems, in order to enable the control valve to cope with the multi-flow control of different systems, the shape and structure of the partition plates of the valve core may be changed, to realize different forms of pairwise communication among the eight connecting port passages of the control valve, so as to meet the needs of different systems. In this way, on the basis of the first embodiment, in order to make the control valve applicable to different thermal management systems, the following solutions are easily obtained.

Figure 12:
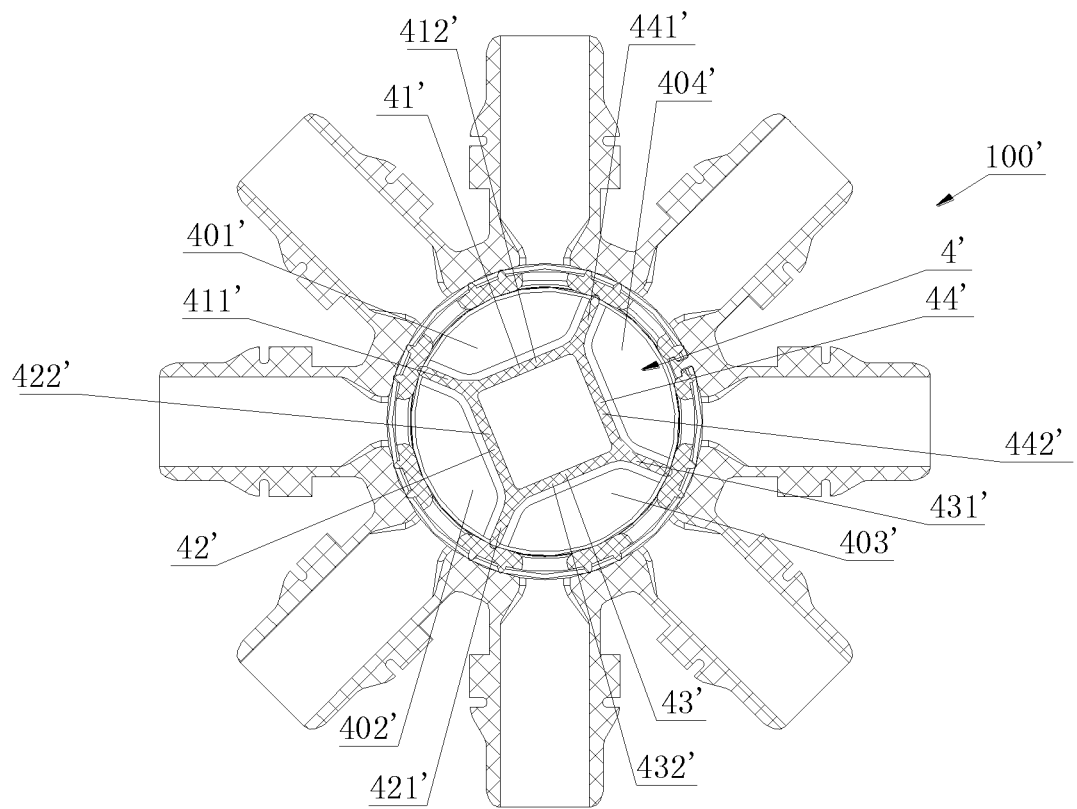
FIG. 12 is a schematic cross-sectional view showing the structure of a control valve according to a solution of a second embodiment.
Figure 13:
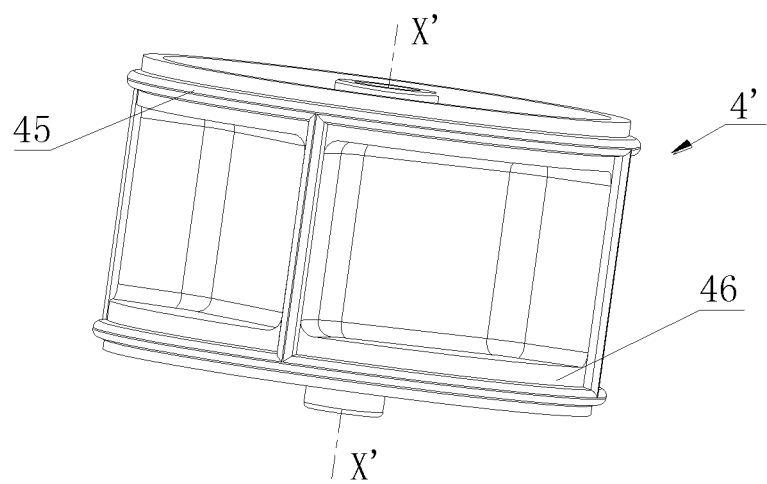
FIG. 13 is a three-dimensional schematic view showing the structure of a valve core in FIG. 12.

Referring to FIG. 12 and FIG. 13, which show a second embodiment of the control valve, in the second embodiment, the shapes, structures and sizes of a first partition plate 41', a second partition plate 42', to third partition plate 43' and a fourth partition plate 44' are the same or similar, the above partitions each includes a first section and a second section having extension directions intersect with each other, the first partition plate 41', the second partition plate 42', the third partition plate 43' and the fourth partition plate 44' are connected in the listed sequence, and the first partition plate 41' is connected with the fourth partition plate 44'. Specifically, one side of the first partition plate 41' is connected with a junction of a first section 441' and a second section 442' of the fourth partition plate 44', and the other side of the first partition plate 41' is flush with the outer edge of the first end wall 45 and/or the outer edge of the second end wall 46; one side of the second partition plate 42' is connected with a junction of a first section 411' and a second section 412' of the first partition plate 41', and the other side of the second partition plate 42' is flush with the outer edge of the first end wall 45 and/or the outer edge of the second end wall 46; one side of the third partition plate 43' is connected with a junction of a first section 421' and a second section 422' of the second partition plate 42', and the other side of the third partition plate 43' is flush with the outer edge of the first end wall 45 and/or the outer edge of the second end wall 46; one side of the fourth partition plate 44' is connected with a junction of a first section 431' and a second section 432' of the third partition plate 43', and the other side of the fourth partition plate 44' is flush with the outer edge of the first end wall 45 and/or the outer edge of the second end wall 46. A first guide passage 401' is formed among the first partition plate 41', the fourth partition plate 44', the first end wall 45 and the second end wall 46; a second guide passage 402' is formed among the first partition plate 41', the second partition plate 42', the first end wall 45 and the second end wall 46; a third guide passage 403' is formed among the second partition plate 42', the third partition plate 43', the first end wall 45 and the second end wall 46; a fourth guide passage 404' is formed among the third partition plate 43', the fourth partition plate 44', the first end wall 45 and the second end wall 46; the first guide passage 401', the second guide passage 402', the third guide passage 403' and the fourth guide passage 404' are equidistantly distributed along the periphery of the valve core 4. A plane is defined to be perpendicular to a central axis X'-X' of the valve core 4', a projection of the first end wall 45 and a projection of the second end wall 46 on this plane are circular and coincide with each other, projections of the first partition plate 41', the second partition plate 42', the third partition plate 43' and the fourth partition plate 44' on this plane are combined to form a square structure. Other structures of the control valve 100' are the same as those of the first embodiment, which are not described herein. In this way, by rotating the valve core 4', different forms of pairwise communication between two adjacent connecting port passages among the eight connecting port passages can be realized, thus meeting the needs of different thermal management systems.

Figure 14:
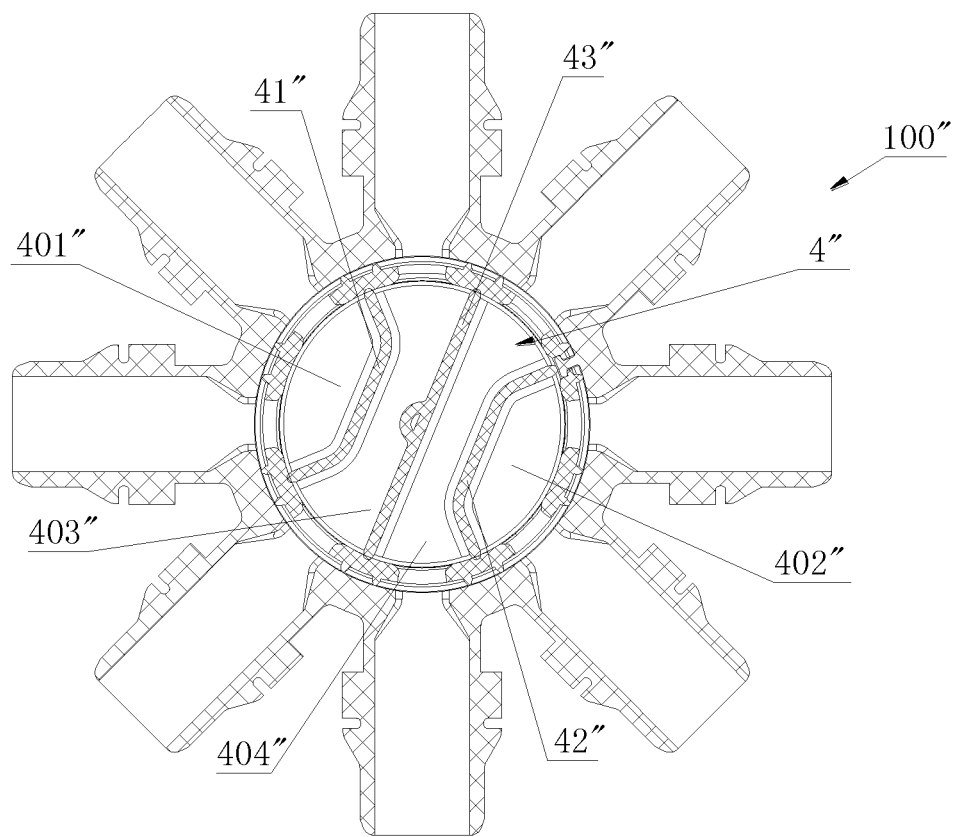
FIG. 14 is a schematic cross-sectional view showing the structure of a control valve according to a solution of a third embodiment.
Figure 15:
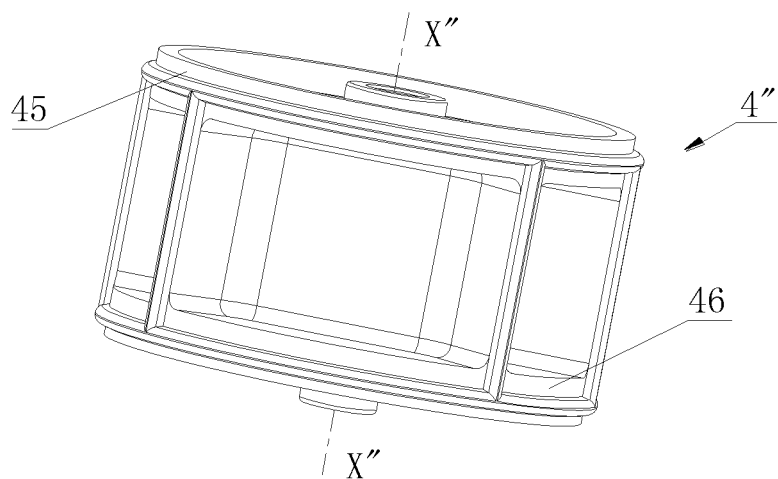
FIG. 15 is a three-dimensional schematic view showing the structure of a valve core in FIG. 14.

Referring to FIG. 14 and FIG. 15, which show a third embodiment of the control valve, in the third embodiment, a valve core 4" includes a first partition plate 41", a second partition plate 42" and a third partition plate 43". In a direction perpendicular to an axis of the valve core 4", by taking the third partition plate 43" as a benchmark, the first partition plate 41" and the second partition plate 42" are located at both sides of the third partition plate 43" respectively, and the first partition plate 41" and the second partition plate 42" may be symmetrically distributed, the first partition plate 41" and the third partition plate 43" are spaced apart, the first partition plate 41" is not directly connected with the third partition plate 43", the second partition plate 42" and the third partition plate 43" are spaced apart, the second partition plate 42" is not directly connected with the third partition plate 43". A first guide passage 401" is formed among the first partition plate 41", the first end wall 45 and the second end wall 46; a second guide passage 402" is formed among the second partition plate 42", the first end wall 45 and the second end wall 46; a third guide passage 403" is formed among the first partition plate 41", the third partition plate 43", the first end wall 45 and the second end wall 46; and a fourth guide passage 404" is formed among the second partition plate 42", the third partition plate 43", the first end wall 45 and the second end wall 46. The third guide passage 403" is closer to the third partition plate 43" than the first guide passage 401", and the fourth guide passage 404" is closer to the third partition plate 43" than the second guide passage 402". In a direction perpendicular to an axis of the valve core 4", by taking the third partition plate 43" as a benchmark, the first guide passage 401" and the second guide passage 402" are located at both sides of the third partition plate 43" respectively and are symmetrically distributed, and the third guide passage 403" and the fourth guide passage 404" are located at both sides of the third partition plate 43" respectively and are symmetrically distributed. The shape and size of the first partition plate 41" and the second partition plate 42" may be the same. A plane is defined to be perpendicular to a central axis X"-X" of the valve core 4", a projection of the first partition plate 41" and a projection of the second partition plate 42" on the plane are both substantially C-shaped, and openings of the two C-shaped projections face opposite directions, a projection of the first end wall 45 and a projection of the second end wall 46 on this plane are circular and coincide with each other, a projection of the first end wall 45 and/or a projection of the second end wall 46 on this plane is divided into two parts with equal or substantially equal areas by a projection of the third partition plate 43" on this plane. Other structures of the control valve 100" are the same as those of the first embodiment, which are not described here.

The embodiments of the control valve 100 shown in FIG. 1 to FIG. 15 are all eight-way valves, that is, there are eight connecting port passages, the valve core has four guide passages, by rotating the valve core, different pairwise communication among the connecting port passages can be realized through the guide passages of the valve core. Of course, in other embodiments, the control valve may have other number of connecting port passages, specifically, it can be defined that the number of connecting port passages of the control valve is 2N, the number of guide passages of the valve core is N, N=2, or N≥3 and N is a positive integer; in this way, by rotating the valve core, different forms of pairwise communication can be realized among the 2N connecting port passages of the control valve through the guide passages. N may be 2, 3, 4, 5 or more. In this specification, N=4 is taken as an example for illustration. In other embodiments, N may be 3, referring to FIG. 6, three guide passages may be provided according to the structures and positions of the first guide passage 401, the second guide passage 402 and the third guide passage 403, the control valve has six connecting port passages, and different forms of pairwise communication of the six-way valve are realized by rotating the valve core.

It should be noted that, the above embodiments are only used to illustrate the present application rather than limit the technical solutions described in the present application, for example, the directional definition such as "front", "back", "left", "right", "up" and "down". Although the present application is described in detail in this specification with reference to the above embodiments, those of ordinary skill in the art should understand that those skilled in the art may still make modification or equivalent replacement to the present application, and all technical solutions and improvements thereof that do not depart from the spirit and scope of the present application shall be covered within the scope of the claims of the present application.

The invention claimed is:

1. A control valve, comprising a valve body component and a valve core, wherein the control valve has a valve body cavity, the valve core is at least partially located in the valve body cavity, the valve body component is provided with connecting port passages, the valve core is provided with guide passages; and wherein the valve core comprises partition plates, a cavity of the valve core is divided into N guide passages by the partition plates, the number of the connecting port passages is defined as 2N, wherein N≥3 and N is a positive integer, and the valve core is configured to be rotated to realize different forms of pairwise communication among the 2N connecting port passages through the N guide passages, wherein the control valve comprises a first connecting port passage, a second connecting port passage, a third connecting port passage, a fourth connecting port passage, a fifth connecting port passage, a sixth connecting port passage, a seventh connecting port passage and an eighth connecting port passage; and the guide passages comprise a first guide passage, a second guide passage, a third guide passage and a fourth guide passage;

wherein the control valve comprises at least one of the following five working modes:

a first working mode: the first connecting port passage is in communication with the second connecting port passage through the first guide passage, the third connecting port passage is in communication with the fourth connecting port passage through the second guide passage, the fifth connecting port passage is in communication with the eighth connecting port passage through the fourth guide passage, the sixth connecting port passage is in communication with the seventh connecting port passage through the third guide passage;

a second working mode: the first connecting port passage is in communication with the sixth connecting port passage through the fourth guide passage, the second connecting port passage is in communication with the third connecting port passage through the second guide passage, the seventh connecting port passage is in communication with the eighth connecting port passage through the third guide passage, the fourth connecting port passage is in communication with the fifth connecting port passage through the second guide passage;

a third working mode: the second connecting port passage is in communication with the seventh connecting port passage through the fourth guide passage, the third connecting port passage is in communication with the fourth connecting port passage through the first guide passage, the fifth connecting port passage is in communication with the sixth connecting port passage through the second guide passage, the first connecting port passage is in communication with the eighth connecting port passage through the third guide passage;

a fourth working mode: the first connecting port passage is in communication with the second connecting port passage through the third guide passage, the third connecting port passage is in communication with the eighth connecting port passage through the fourth guide passage, the fourth connecting port passage is in communication with the fifth connecting port passage through the first guide passage, the sixth connecting port passage is in communication with the seventh connecting port passage through the second guide passage;

a fifth working mode: the first connecting port passage is in communication with the fourth connecting port passage through the fourth guide passage, the second connecting port passage is in communication with the third connecting port passage through the third guide passage, the fifth connecting port passage is in communication with the sixth connecting port passage through the first guide passage, the seventh connecting port passage is in communication with the eighth connecting port passage through the second guide passage.

2. The control valve according to claim 1, wherein the valve body component comprises connecting port portions and a side wall connected with each other, each of the connecting port portions extends away from the valve body cavity along a radial direction of the side wall, the connecting port portions are distributed along an outer circumference of the side wall, the connecting port portions are located at a same height or substantially located at a same height of the valve body component, and at least part of each of the connecting port passages is located at the corresponding connecting port portion.

3. The control valve according to claim 2, wherein the valve core further comprises a first end wall and a second end wall, the guide passages are defined by the partition plates, the first end wall and the second end wall; and wherein in an axial direction of the valve core, the partition plates are located between the first end wall and the second end wall, one end of each of the partition plates in the axial direction of the valve core is connected with the first end wall, and the other end of each of the partition plates in the axial direction of the valve core is connected with the second end wall.

4. The control valve according to claim 3, wherein the number of the connecting port portions is eight, and the number of the connecting port passages is eight; the number of the partition plates is three or four, and the number of the guide passages is four; and wherein the valve core is configured to be rotated to realize different forms of pairwise communication among the eight connecting port passages through the four guide passages.

5. The control valve according to claim 4, wherein the partition plates comprise a first partition plate, a second partition plate, a third partition plate and a fourth partition plate; extension directions of the first partition plate, the second partition plate and the fourth partition plate intersect;

the first partition plate, the second partition plate and the fourth partition plate are connected in pairs, the third partition plate and the fourth partition plate are spaced apart; in the radial direction of the valve core, both the first partition plate and the second partition plate are located at one side of the fourth partition plate, and the third partition plate is located at the other side of the fourth partition plate.

6. The control valve according to claim 4, wherein the partition plates comprise a first partition plate, a second partition plate, a third partition plate and a fourth partition plate; the first partition plate, the second partition plate, the third partition plate and the fourth partition plate are connected in sequence, and the first partition plate is connected with the fourth partition plate.

7. The control valve according to claim 4, wherein the partition plates comprise a first partition plate, a second partition plate and a third partition plate; along a radial direction of the valve core, the first partition plate and the second partition plate are located at both sides of the third partition plate respectively and are each spaced apart from the third partition plate, and the first partition plate and the second partition plate are symmetrically distributed; and wherein both sides, in the radial direction of the valve core, of each of the partition plates are respectively flush with an outer edge of the first end wall; and/or, both sides, in the radial direction of the valve core, of each of the partition plates are respectively flush with an outer edge of the second end wall.

8. The control valve according to claim 3, wherein the partition plates comprise a first partition plate, a second partition plate, a third partition plate and a fourth partition plate; extension directions of the first partition plate, the second partition plate and the fourth partition plate intersect; the first partition plate, the second partition plate and the fourth partition plate are connected in pairs, the third partition plate and the fourth partition plate are spaced apart; in the radial direction of the valve core, both the first partition plate and the second partition plate are located at one side of the fourth partition plate, and the third partition plate is located at the other side of the fourth partition plate.

9. The control valve according to claim 8, wherein one side of the first partition plate is connected with the second partition plate, the other side of the first partition plate is connected with the fourth partition plate; one side of the second partition plate is flush with an outer edge of the first end wall and/or an outer edge of the second end wall, the other side of the second partition plate is connected with the fourth partition plate; one side of the fourth partition plate is flush with the outer edge of the first end wall and/or the outer edge of the second end wall, the other side of the fourth partition plate is flush with the outer edge of the first end wall and/or the outer edge of the second end wall; both sides of the third partition plate are respectively flush with the outer edge of the first end wall, and/or both sides of the third partition plate are respectively flush with the outer edge of the second end wall.

10. The control valve according to claim 9, wherein a plane is defined to be perpendicular to a central axis (X-X) of the valve core, a projection of the first end wall on the plane and a projection of the second end wall on the plane coincide with each other, a projection of the fourth partition plate on the plane divides the projection of the first end wall and/or the second end wall on the plane into two parts with equal or substantially equal areas, projections of the first partition plate, the second partition plate and the fourth partition plate on the plane are combined to form a substantially triangular structure.

11. The control valve according to claim 8, wherein the guide passages comprise a first guide passage, a second guide passage, a third guide passage and a fourth guide passage; the first guide passage and the second guide passage are formed among the first partition plate, the second partition plate, the fourth partition plate, the first end wall and the second end wall; the third guide passage is formed among the third partition plate, the first end wall and the second end wall; and the fourth guide passage is formed among the fourth partition plate, the third partition plate, the first end wall and the second end wall; and wherein in the radial direction of the valve core, both the first guide passage and the second guide passage are located at the one side of the fourth partition plate, both the third guide passage and the fourth guide passage are located at the other side of the fourth partition plate, and the fourth guide passage is arranged closer to the fourth partition plate than the third guide passage.

12. The control valve according to claim 11, wherein a plane is defined to be perpendicular to a central axis (X-X) of the valve core, a projection of the first end wall on the plane and a projection of the second end wall on the plane coincide with each other, a projection of the fourth partition plate on the plane divides the projection of the first end wall and/or the second end wall on the plane into two parts with equal or substantially equal areas, projections of the first partition plate, the second partition plate and the fourth partition plate on the plane are combined to form a substantially triangular structure.

13. The control valve according to claim 3, wherein the partition plates comprise a first partition plate, a second partition plate, a third partition plate and a fourth partition plate; the first partition plate, the second partition plate, the third partition plate and the fourth partition plate are connected in sequence, and the first partition plate is connected with the fourth partition plate.

14. The control valve according to claim 13, wherein one side of the first partition plate is connected with the fourth partition plate, and the other side of the first partition plate is flush with an outer edge of the first end wall and/or an outer edge of the second end wall; one side of the second partition plate is connected with the first partition plate, and the other side of the second partition plate is flush with the outer edge of the first end wall and/or the outer edge of the second end wall; one side of the third partition plate is connected with the second partition plate, and the other side of the third partition plate is flush with the outer edge of the first end wall and/or the outer edge of the second end wall; one side of the fourth partition plate is connected with the third partition plate, and the other side of the fourth partition plate is flush with the outer edge of the first end wall and/or the outer edge of the second end wall.

15. The control valve according to claim 14, wherein the guide passages comprise a first guide passage, a second guide passage, a third guide passage and a fourth guide passage; the first guide passage is formed among the first partition plate, the fourth partition plate, the first end wall and the second end wall; the second guide passage is formed among the first partition plate, the second partition plate, the first end wall and the second end wall; the third guide passage is formed among the second partition plate, the third partition plate, the first end wall and the second end wall; and the fourth guide passage is formed among the third partition plate, the fourth partition plate, the first end wall and the second end wall; and wherein the first guide passage, the second guide passage, the third guide passage and the fourth guide passage are equidistantly distributed along a periphery of the valve core.

16. The control valve according to claim 3, wherein the partition plates comprise a first partition plate, a second partition plate and a third partition plate; along a radial direction of the valve core, the first partition plate and the second partition plate are located at both sides of the third partition plate respectively and are each spaced apart from the third partition plate, and the first partition plate and the second partition plate are symmetrically distributed; and wherein both sides, in the radial direction of the valve core, of each of the partition plates are respectively flush with an outer edge of the first end wall; and/or, both sides, in the radial direction of the valve core, of each of the partition plates are respectively flush with an outer edge of the second end wall.

17. The control valve according to claim 16, wherein the guide passages comprise a first guide passage, a second guide passage, a third guide passage and a fourth guide passage; the first guide passage is formed among the first partition plate, the first end wall and the second end wall; the second guide passage is formed among the second partition plate, the first end wall and the second end wall; the third guide passage is formed among the first partition plate, the third partition plate, the first end wall and the second end wall; the fourth guide passage is formed among the second partition plate, the third partition plate, the first end wall and the second end wall; and wherein in the radial direction of the valve core, the third guide passage is arranged closer to the third partition plate than the first guide passage, the fourth guide passage is arranged closer to the third partition plate than the second guide passage; both the first guide passage and the third guide passage are located at one side of the third partition plate, and both the second guide passage and the fourth guide passage are located at the other side of the third partition plate.

18. A thermal management assembly, comprising a control valve and a fluid assembly, wherein the control valve is the control valve according to claim 1; and wherein at least one working fluid loop is formed by the control valve and the fluid assembly.

* * * * *